United States Patent
Ewing et al.

(10) Patent No.: US 9,964,663 B2
(45) Date of Patent: May 8, 2018

(54) EXTENDED INFRARED IMAGING SYSTEM

(71) Applicants: Kenneth J. Ewing, Edgewood, MD (US); Jasbinder S. Sanghera, Ashburn, VA (US); Kevin J. Major, Charlotte, NC (US)

(72) Inventors: Kenneth J. Ewing, Edgewood, MD (US); Jasbinder S. Sanghera, Ashburn, VA (US); Kevin J. Major, Charlotte, NC (US)

(73) Assignees: The United States of America, as represented by the Secretary of the Navy, Washington, DC (US); The University of North Carolina at Charlotte, Charlotte, NC (US)

( * ) Notice: Subject to any disclaimer, the term of this patent is extended or adjusted under 35 U.S.C. 154(b) by 0 days. days.

(21) Appl. No.: 14/830,826

(22) Filed: Aug. 20, 2015

(65) Prior Publication Data
US 2016/0061666 A1    Mar. 3, 2016

Related U.S. Application Data (60) Provisional application No. 62/041,836, filed on Aug. 26, 2014.

(51) Int. Cl.
*G01V 8/10* (2006.01)
*G01J 5/08* (2006.01)
*G01J 5/00* (2006.01)

(52) U.S. Cl.
CPC .............. *G01V 8/10* (2013.01); *G01J 5/0803* (2013.01); *G01J 2005/0077* (2013.01)

(58) Field of Classification Search
CPC ...... G01J 5/007; G01J 5/22; G01J 2005/0077; G01V 8/10
USPC ................. 250/339.02, 339.01, 338.1, 336.1
See application file for complete search history.

(56) References Cited

U.S. PATENT DOCUMENTS

| | | | | |
|---|---|---|---|---|
| 3,354,309 A * | 11/1967 | Volkovisky | ............... | G01J 5/12 136/213 |
| 4,710,629 A * | 12/1987 | Muller | ................. | G08B 29/046 250/252.1 |
| 5,376,443 A * | 12/1994 | Sijan | ................. | B32B 17/10018 244/121 |
| 7,345,279 B2 * | 3/2008 | Mueller | .................... | G01J 9/04 250/341.1 |
| 7,378,658 B2 * | 5/2008 | Mueller | .................... | G01J 3/42 250/330 |
| 7,804,441 B1 * | 9/2010 | DeChiaro, Jr. | ........ | G01V 8/005 342/22 |

(Continued)

OTHER PUBLICATIONS

Agarwal et al., "Motheye Structured Surface Fabrication as Durable Anti-Reflection Treatment on CdZnTe for Space based LWIR Detector Devices" Proc. of SPIE vol. 6542, 65422B, (2007).

(Continued)

*Primary Examiner* — David Porta
*Assistant Examiner* — Blake Riddick
(74) *Attorney, Agent, or Firm* — Clements Bernard Walker PLLC; Christopher L. Bernard (57) ABSTRACT

An apparatus having: one or more infrared imagers capable of detecting light having wavelengths of 8-10 microns and 20-22 microns and a window transparent to light having wavelengths of 8-10 microns and 20-22 microns.

22 Claims, 9 Drawing Sheets

(56) References Cited

U.S. PATENT DOCUMENTS

| | | | | |
|---|---|---|---|---|
| 2002/0176158 | A1* | 11/2002 | Minami | G02B 1/11 359/356 |
| 2003/0141455 | A1* | 7/2003 | Lambert | G01J 5/0022 250/353 |
| 2005/0207943 | A1* | 9/2005 | Puzey | C12Q 1/04 422/82.05 |
| 2006/0087471 | A1* | 4/2006 | Hintz | G01S 7/2923 342/22 |
| 2009/0072144 | A1* | 3/2009 | Krishna | G01J 3/02 250/338.4 |
| 2010/0166330 | A1* | 7/2010 | Thyagarajan | G01J 3/2823 382/250 |
| 2011/0033156 | A1 | 2/2011 | Sanghera et al. | |
| 2011/0205367 | A1* | 8/2011 | Brown | H04N 5/33 348/164 |
| 2011/0242328 | A1* | 10/2011 | Twede | H04N 5/33 348/164 |
| 2011/0242533 | A1* | 10/2011 | Treado | G01J 3/32 356/326 |
| 2011/0261351 | A1* | 10/2011 | Treado | G01J 3/32 356/73 |
| 2012/0098972 | A1* | 4/2012 | Hansen | H04N 5/2258 348/164 |
| 2014/0009757 | A1* | 1/2014 | Bodkin | G01J 4/04 356/300 |
| 2014/0062754 | A1* | 3/2014 | Mohamadi | F41H 11/136 342/22 |
| 2014/0226021 | A1* | 8/2014 | Koechlin | G01J 5/08 348/165 |
| 2015/0159995 | A1* | 6/2015 | Tixier | G01B 11/0691 702/172 |

OTHER PUBLICATIONS

Ewing et al., "Investigation of disturbed earth detection in the very long wavelength infrared (VLWIR)" Proc. of SPIE vol. 9072, 90721E (May 29, 2014).

Goldberg et al., "Detection of buried land mines using a dual-band LWIR/LWIR QWIP focal plane array" Infrared Physics & Technology 44 (2003) 427-437.

Hobbs, "Study of the Environmental and Optical Durability of AR Microstructures in Sapphire, ALON, and Diamond" Proc. of SPIE vol. 7302, 73020J (2009).

Johnson et al., "Infrared Measurements of Pristine and Disturbed Soils 1. Spectral Contrast Differences between Field and Laboratory Data" Remote Sens. Environ. 64:34-46 (1998).

Kaless et al., "NANO-motheye antireflection pattern by plasma treatment of polymers" Surface & Coatings Technology 200 (2005) 58- 61.

Schulz et al., "New plasma processes for antireflective structures on plastics" Proc. of SPIE vol. 7101, 710107 (2008).

Simms et al., "Analysis of Long Wave Infrared (LWIR) Soil Data to Predict Reflectance Response" (2009).

* cited by examiner

Reduce reflection loss: h > λ/2
Avoid diffraction effects: d < λ/2n

Micron scale features in IR

EXTENDED INFRARED IMAGING SYSTEM

This application claims the benefit of U.S. Provisional Application No. 62/041,836, filed on Aug. 26, 2014. The provisional application and all other publications and patent documents referred to throughout this nonprovisional application are incorporated herein by reference.

TECHNICAL FIELD

The present disclosure is generally related to infrared imaging.

DESCRIPTION OF RELATED ART

Detection of buried objects such as improvised explosive devices (IEDs) is possible by imaging the soil surface to detect changes on the soil reflectivity due to a redistribution of soil particulates during the IED burying process (Johnson et al., "Infrared Measurements of Pristine and Disturbed Soils 1. Spectral Contrast Differences between Field and Laboratory Data", *Remote Sensing of Environment* 64 (1998) 34-46; Goldberg et al., "Detection of buried land mines using a dual-band LWIR/LWIR QWIP focal plane array", *Infrared Physics & Technology*, 44 (2003) 427-437). Current long wavelength infrared cameras (7-14 µm) are capable of exploiting the change in reflectivity of disturbed soils to identify buried IEDs. The mechanism of detection of disturbed earth is based on the spectral properties of quartz particulates which are distributed throughout the world's soils at varying concentrations in the soil (Johnson, *Remote Sensing of Environment* 64 (1998) 34-46).

Other mine detection devices depend on electrical transduction, i.e., metal detectors. These devices are not capable of standoff detection.

BRIEF SUMMARY

Disclosed herein is an apparatus comprising: one or more infrared imagers capable of detecting light having wavelengths of 8-10 microns and 20-22 microns, wherein the one or more infrared imagers comprise a window transparent to light having wavelengths of 8-10 microns and 20-22 microns.

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Disclosed herein is a detection system for the presence of disturbed soil and buried objects, including IEDs, by expanding the wavelength range of current buried mine detectors (which only detect the 9 µm Reststrahlen band) to include the second Reststrahlen band nominally at 21 µm.

Figure 1A:
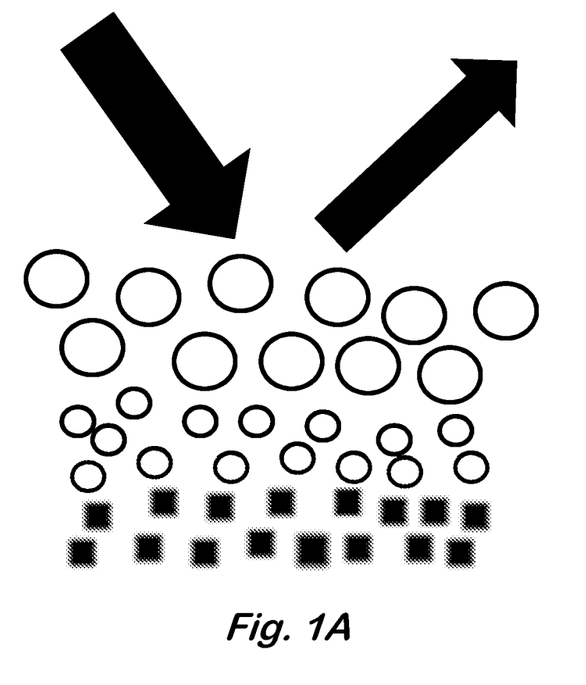
FIGS. 1A and 1B schematically illustrate the particle size distribution of soil particles in undisturbed (A) and disturbed (B) soil.
Figure 1B:
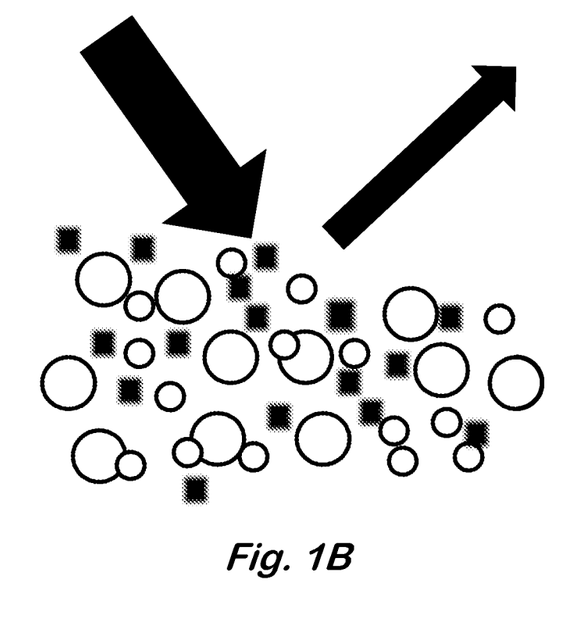

Undisturbed soil generally consists of larger silica particles at the surface where the smaller particles have been removed from the surface by weathering, i.e., rain (FIG. 1A). Large silica particles exhibit a significant reflectance in the 7-12 µm spectral region called the Reststrahlen band. It has been demonstrated that the Reststrahlen band intensity is proportional to the particle size distribution of silica in the soil; as the proportion of small to large silica particles increases the Reststrahlen band also decreases in intensity. When soil is disturbed, for example when an object is buried, the distribution of silica particles is changed such that the "new" surface consists of a greater proportion of small to large silica particles (FIG. 1B). The increased number of small silica particles decreases the intensity of the Reststrahlen band therefore enabling detection of buried objects by imaging in the 7-12 µm spectral range.

As used herein, an infrared imager may be any device that detects infrared light, and may generate a signal that corresponds to the intensity, energy, power, wavelength, or other property of the detected light. It may detect a two dimensional image of pixels or only a single signal for all incident light. Suitable IR imagers and detectors are commercially available and known in the art. The imager may discriminate between wavelengths of IR light from 7-25 microns, or any one or more possible subsets within, for example 7-12, 8-10, 17-25, and 20-22 microns. A microbolometer is a suitable imager. The image may be precise to, for example, 1 micron, 0.1 micron, or better.

The detected IR light passes through a window before reaching the sensing element of the imager. The window is typically needed to protect the sensing element and/to act as a lens, and may be incorporated into the imager or be a separate article. The window may include more than one element if the infrared light passes through multiple elements to reach the detecting element. The window is transparent to at least the same wavelengths of IR light described above. Transparent may mean that the window has a percent transmittance of at least 50%, 65%, or 80% of a given wavelength. Suitable window materials include, but are not limited to, diamond and thallium bromoiodide (KRS-5), and the window may comprises at least 50, 90, or 99 wt % of such materials.

To generate the data disclosed herein, sea sand was purchased from Sigma Aldrich and used as received. IR reflectance spectra were generated using a Thermo-Electron Nexus 670 FTIR with a diffuse reflectance accessory. Diffuse reflectance spectra of both undisturbed and disturbed sand were acquired at an angle of 15° to the horizontal. The reflectance spectrum of sea sand was first acquired as a flat surface representing the undisturbed surface. Then the sample was mixed in the sample cup using a small spatula representing the disturbed surface and the IR reflectance of the sample acquired. A total of 65 spectra were co-added for each scan.

Blackbody curves for transmission through 10 m and 30 m of air were generated using MODTRAN. The model utilized the 1976 US standard atmosphere which includes the atmospheric species: $CO_2$, $H_2O$, and $O_3$. The total power emitted from the sand surface, $P^{total}$ in W/m$^2$ over the wavelength regions 7-11 μm and 17-25 μm was calculated according to:

$$P_{total} = \int_{\lambda_1}^{\lambda_2} S_{\lambda_1,\lambda_2} P_{BB} d\lambda$$

where $S_{\lambda_1,\lambda_2}$ is the spectral window for the Reststrahlen bands and $P_{BB}$ is the power over the spectral range for the blackbody at a temperature of 37° C. (100° F.) over a distance of 10 m and 30 m. Generation of the total emitted power was performed over the spectral ranges of 7-11 μm for the first Reststrahlen band and 17-25 μm for the second Reststrahlen band.

Figure 2:
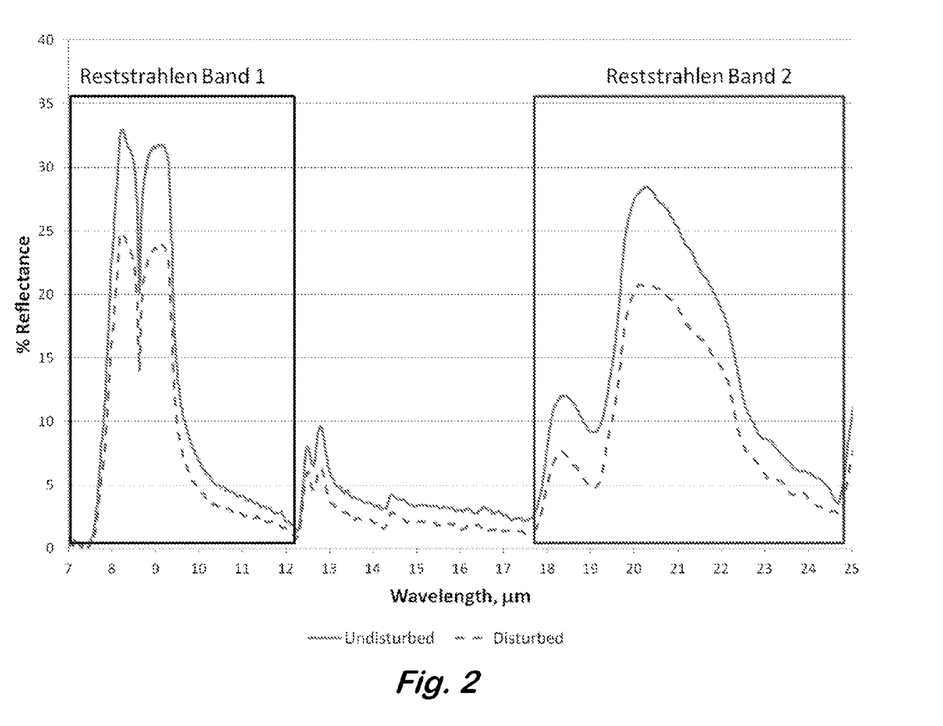
FIG. 2 shows infrared spectra demonstrating the change in reflectance of a sample of sea sand associated with disturbing the sand surface. The solid curve is the undisturbed sand and dashed curve is the disturbed sand. This data demonstrates that a second Reststrahlen band, in the 17-25 µm region, is available for generation of higher contrast images of disturbed earth.

The changes in the reflected intensity for the Reststrahlen band at 9 μm is a spectral parameter for detection of disturbed earth (Goldberg, *Infrared Physics & Technology*, 44 (2003) 427-437)). FIG. 2 shows a reflectance infrared spectrum of ordinary sea sand in the spectral range 5-25 μm for an undisturbed and disturbed sample. Current long wavelength imaging cameras are able to detect changes in the reflectivity associated with the Reststrahlen band in the 7-12 μm region. However, the spectrum also shows the presence of a second Reststrahlen band in the 17-25 μm region. This very long wavelength Reststrahlen band (21 microns nominally) also exhibits a comparable decrease in reflectivity for the disturbed soil sample as the 9 μm Reststrahlen band. Therefore, from the perspective of detecting disturbed soil based on the Reststrahlen bands, enabling access of imaging systems to both Reststrahlen bands will increase the image contrast and conversely increase the probability of detection, and decrease the false alarm rate for detection of buried IEDs.

Figure 3:
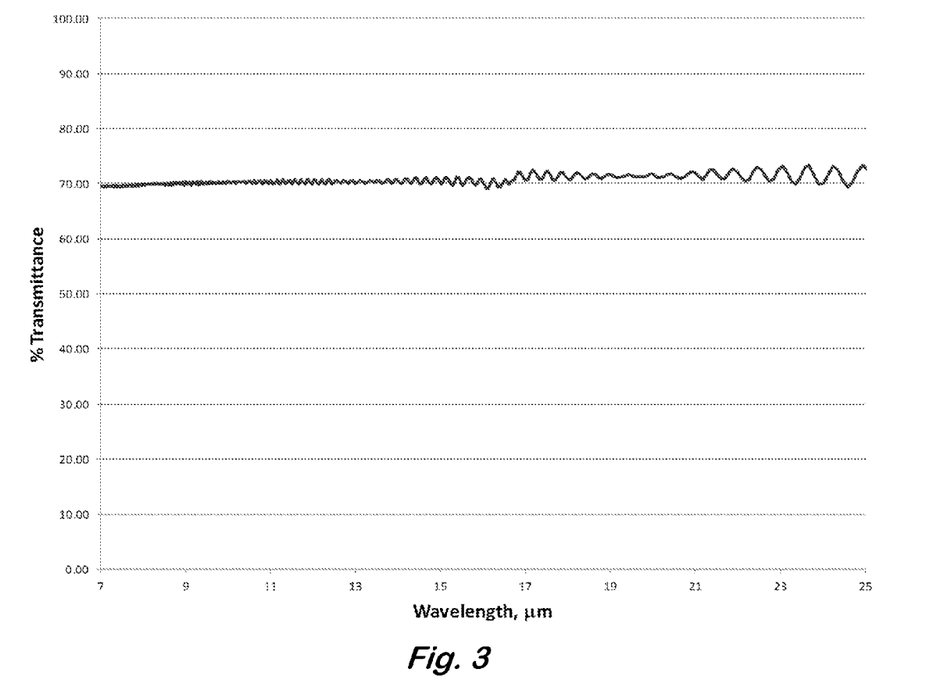
FIG. 3 shows an infrared spectrum of a commercial off-the-shelf (COT) CVD diamond window 200 µm thick.

The disclosed disturbed detection system may be considered a quasi-hyperspectral imaging system enabling the collection of radiation in both Reststrahlen band regions resulting in a higher contrast image of disturbed earth than conventional systems. The system may replace existing IR transmitting windows with windows that transmit out to, for example, 30 μm. FIG. 3 shows an infrared spectrum of a COTs CVD diamond window 200 μm thick. The diamond or other windows may be utilized with any IR imaging system, for example a micro-bolometer imaging camera, to enable the collection of both Reststrahlen bands. The inclusion of the second Reststrahlen band can increase the image contrast up to 50% or 100% greater than conventional systems. Increased contrast may enable better imaging of buried IED/mines thereby increasing the probability of detection and lowering false alarm rate of the system.

In order to limit the amount of background light entering the system selective bandpass filters, that only allow light to enter the system corresponding to the two Reststrahlen bands in the 7-12 μm and 17-25 μm regions of the spectrum, may be incorporated into the imaging system. FIG. 2 shows the bandpass filter ranges required to collect only reflected light from the two Reststrahlen bands. Based on the integrated area under both Reststrahlen bands, extending the imaging capability to include the 17-25 μm band results in a 50% increase in the contrast of the image; where the contrast is defined as the difference in power reaching the micro-bolometer from undisturbed and disturbed earth. The system may therefore enable detection of buried IEDs in real time using a man portable, low cost platform.

To achieve even higher contrast between the surrounding ground and disturbed earth the system light collection efficiency may be improved in the 7-12 μm and 17-25 μm regions of the spectrum. This may be achieved by applying anti-reflection structures such as Patterned Anti-Reflection Surface Structures (PARSS) or anti-reflection interference coatings onto diamond, or possibly KRS-5, windows.

Patterned Anti-Reflective Surface Structures (PARSS) (Kaless et al., "NANO-motheye antireflection pattern by plasma treatment of polymers", *Surface Coatings and Technologies*, 200 (2005), 58-61; Schulz et al., "New plasma processes for antireflective structures on plastics", *Proc. of SPIE*, 7101 (2008)) may be designed and applied to the surface of the windows to increase light throughput across a broad energy band such as 7-25 μm. PARSS structures are bio-inspired from moth eye structure, which consists of an array of sub-micron cones on the order of 220 nm in size which reduces reflection in the visible region of the spectrum enabling the moth to escape detection from predators. The PARSS technology involves generation of cone-shaped physical structures on the surface of the optical material. Because of this, the PARSS technique can be applied to virtually any material ranging from plastics (Kaless, *Surface Coatings and Technologies*, 200 (2005), 58-61; Schulz, *Proc. of SPIE*, 7101 (2008)) to common IR windows such as CdZnTe (Agarwal et al., "Motheye structures surface fabrication as a durable treatment on CdZnTe for space based LWIR detector devices", *Proc. of SPIE*, 6542 (2007)), IR transmitting optical fibers (Sanghera et al., U.S. Patent Appl. Publ. No. 2011/0033156 A1 (2011)) and also to diamond (Hobbs, "Study of the environmental and optical durability of AR microstructures in sapphire, ALON, and Diamond", *Proc. of SPIE*, 7302 (2009)).

Figure 4:
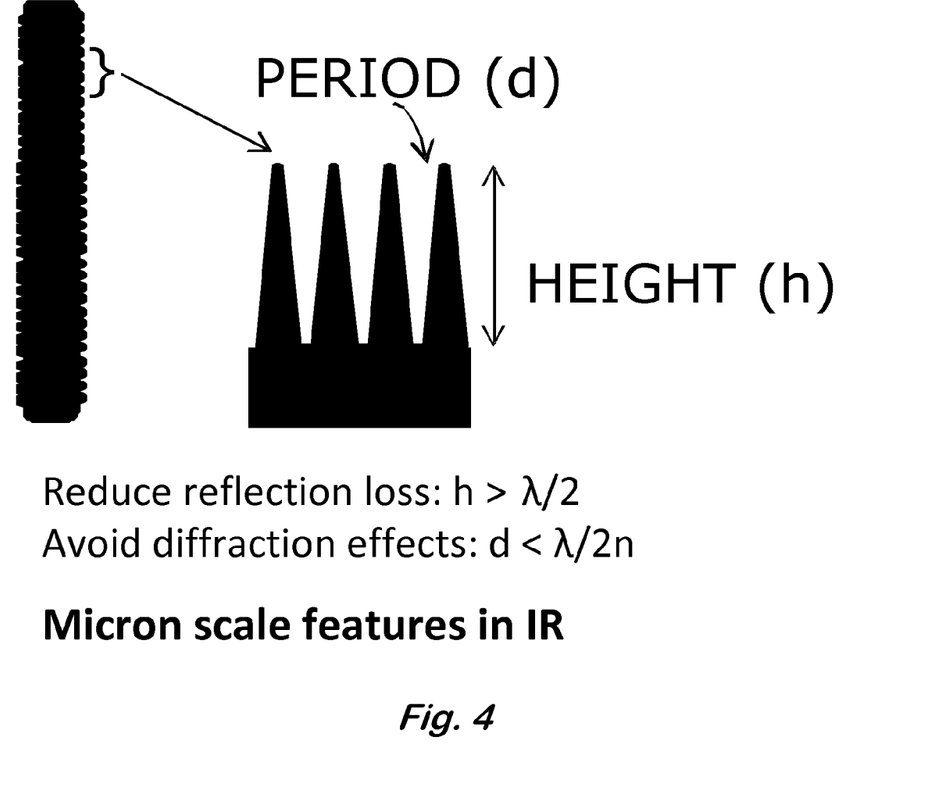
FIG. 4 shows Patterned Anti-Reflective Surface Structure (PARSS) fabrication parameters for LWIR (long wavelength infrared) to VLWIR (very long wavelength infrared).
Figure 5:
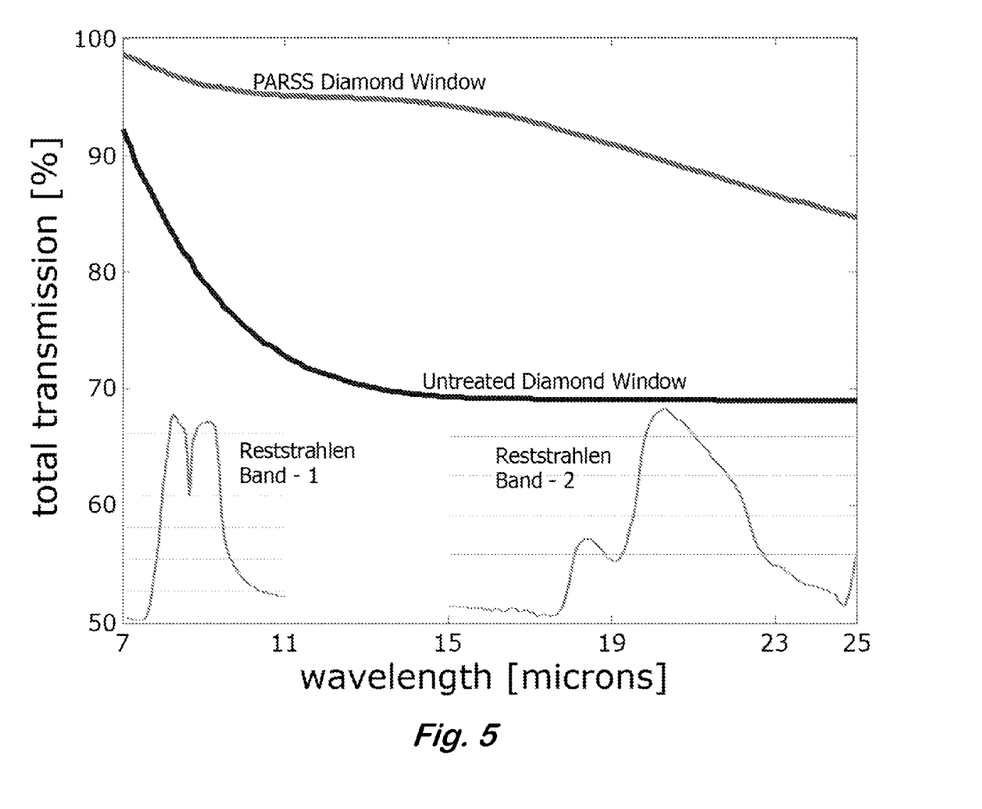
FIG. 5 shows a comparison of the transmission of an untreated diamond window and the transmission of a PARSS diamond window. Reststrahlen bands 1 and 2 are also shown at the bottom of the plot.

FIG. 4 illustrates the important parameters affecting the performance of the PARSS structures at different wavelengths. The height, h, of the surface structures for reflection reduction at a given wavelength is given by: h>λ/2. The period of the structures, d, determines the diffraction effects which affect the degree of light scattering at different wavelengths and is given by: d<λ/2n, where n is the refractive index of the window material (Schulz, *Proc. of SPIE*, 7101 (2008). At the longer wavelength regions proposed for the observation of the 7-12 µm and 17-25 µm Reststrahlen bands the height and spacing requirements are on the order of 5 microns making the fabrication of the PARSS significantly easier. Calculations for a diamond window with PARSS on both faces of the window show a significant increase in the percent of light transmitted by the diamond window over the wavelength range 7-25 µm. FIG. 5 compares the percent transmission from 7 to 25 µm for an untreated diamond window and a PARSS diamond window. The transmission of the diamond window is significantly increased by the PARSS treatment enabling collection of infrared light from both Reststrahlen band 1 and 2, thereby increasing the optical contrast for disturbed earth. The application of PARSS anti-reflection treatment to other IR transmitting windows, such as KRS-5 (thallium bromoiodide), is also possible.

Figure 6A:
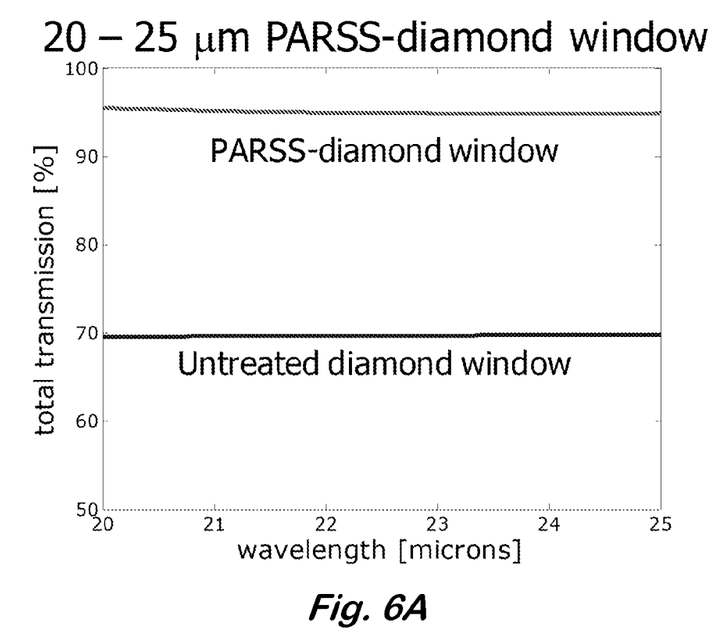
FIGS. 6A and 6B show a comparison of PARSS-diamond window transmission for maximum transmission in the (A) 20-25 µm range, % T=95.0% and (B) 17-25 µm range, % T=95.1%.
Figure 6B:
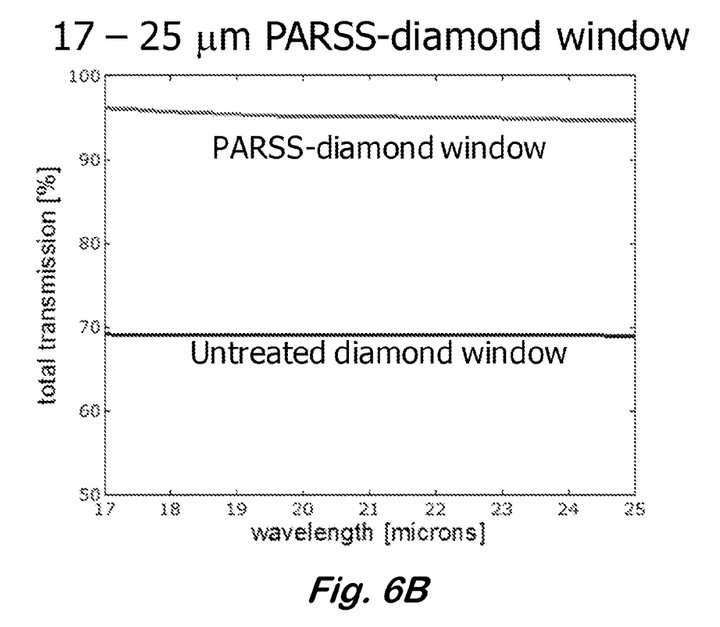
Figure 7:
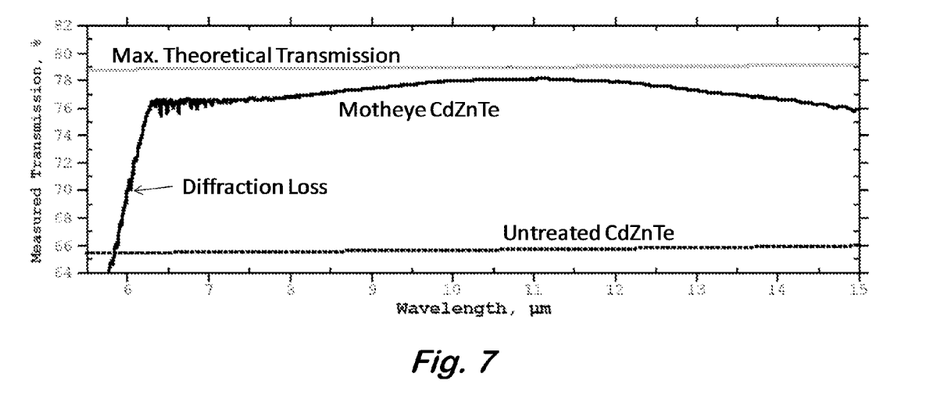
FIG. 7 shows a transmission spectrum of a motheye window showing the sharp cutoff at 6.3 µm due to diffraction losses.

Another property of PARSS is the high degree of wavelength dependent light scattering that occurs below a specific wavelength as defined by the PARSS configuration (Agarwal, *Proc. of SPIE*, 6542 (2007). This property may enable diamond-PARSS to act as both an antireflection coating and an optical band pass filter. Calculations for a PARSS-diamond window designed for maximum transmission in the wavelength ranges of 20-25 µm and 17-25 µm are shown in FIG. 6. Here, the maximum transmission of the two PARSS-diamond windows enables collection of approximately 95% of the light from Reststrahlen band 2 over either a 20-25 µm or 17-25 µm wavelength range, respectively. An additional advantage of PARSS is that the surface structures can be designed to act as a filter, transmitting in the 17-25 µm band with a steep drop in transmittance due to diffraction effects. An example of a motheye window with a sharp cutoff at 6.3 µm due to diffraction effects of the motheye structures is shown in FIG. 7.

Traditional anti-reflection filters, also called interference filters, are composed of multiple thin film devices deposited onto an optical element such as a window or lens. Wavelength selection is based on the property of destructive light interference as the incident light passes through multiple coated reflecting surfaces. The distance between the reflective coatings determines which wavelengths destructively interfere and which wavelengths are in phase and ultimately pass through the coatings. If the reflected beams are in phase, the light is passed through two reflective surfaces. If, on the other hand, the multiple reflections are not in phase, destructive interference reduces the transmission of these wavelengths through the device to near zero. This principle strongly attenuates the transmitted intensity of light at wavelengths that are higher or lower than the wavelength of interest.

Figure 8:
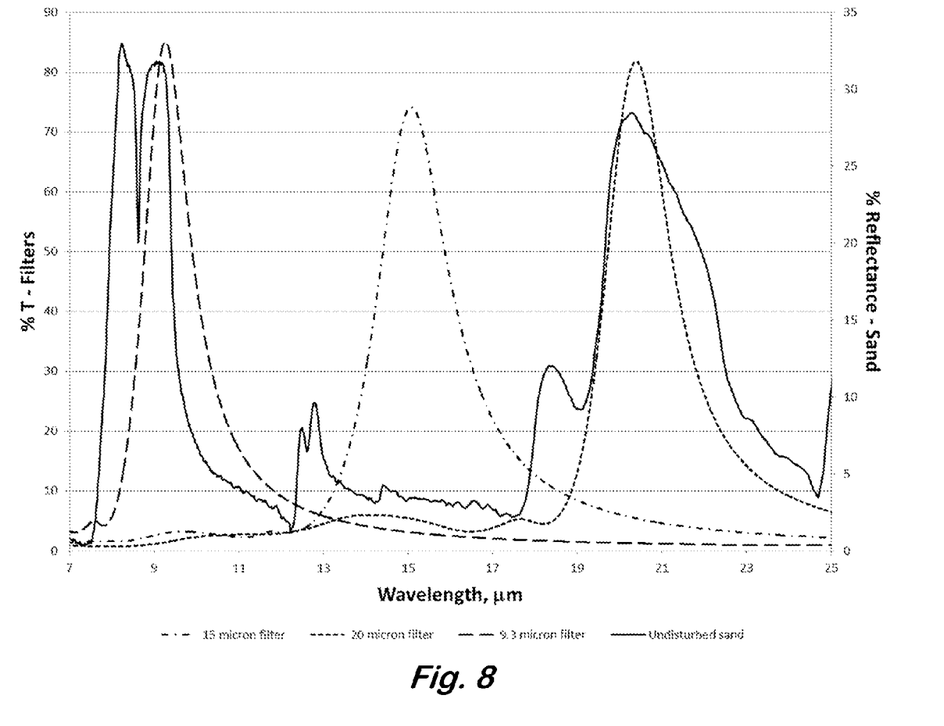
FIG. 8 shows transmission filters for Reststrahlen band imaging compared to sea sand IR reflectance spectrum. The solid line is for undisturbed soil and the dashed lines are for the various filters.

The system may also use bandpass filters that exhibit a wide wavelength range to collect the maximum amount of light from the Reststrahlen bands over the wavelength ranges 7-12 µm and 17-25 µm. Examples of filters that have been made in this spectral region are shown in FIG. 8 superimposed over the reflectance spectrum of sea sand. One filter centered at 20 µm with a maximum % T of 82% is a suitable transmission filter for the 17-25 µm Reststrahlen band. The filter centered at 15 µm can be used as a reference for determining the absolute change in the Reststrahlen bands in disturbed earth compared to undisturbed earth. The second filter, centered at 9.3 microns with a % T of 85% is a suitable transmission filter for the 9 micron Reststrahlen band.

The apparatus may be used by obtaining an IR image of an area the ground at two different times and comparing the images. If the second image shows less IR reflectance in the Reststrahlen bands, it may indicate the ground had been disturbed before the second image was taken. Alternatively, such a comparison may be between a portion of a single image and the rest of the same image. A disturbed area may appear as a darker spot in IR image. As used herein, "ground" means any terrain in which digging and refilling is possible, including but not limited to, soil and sand.

By increasing the wavelength range of the imaging system the contrast between the disturbed earth resulting from burying the mine, and the surrounding soil will be increased significantly. The increased contrast, which is directly related to the increased power delivered to the camera, will better define the shape of the disturbed earth reducing false alarms due to interference from normal ground disturbances such as vehicle traffic, pedestrian traffic, and animal activity. This system extends the observable wavelength range to include Reststrahlen Band 2 which will increase the total power delivered to the CCD array. For example, the IR reflectance spectra of undisturbed and disturbed earth are presented in FIG. 9. The MODTRAN transmission spectrum of the atmosphere over a 30 m pathlength for a black body temperature at 300K is also presented in this figure.

Figure 9:
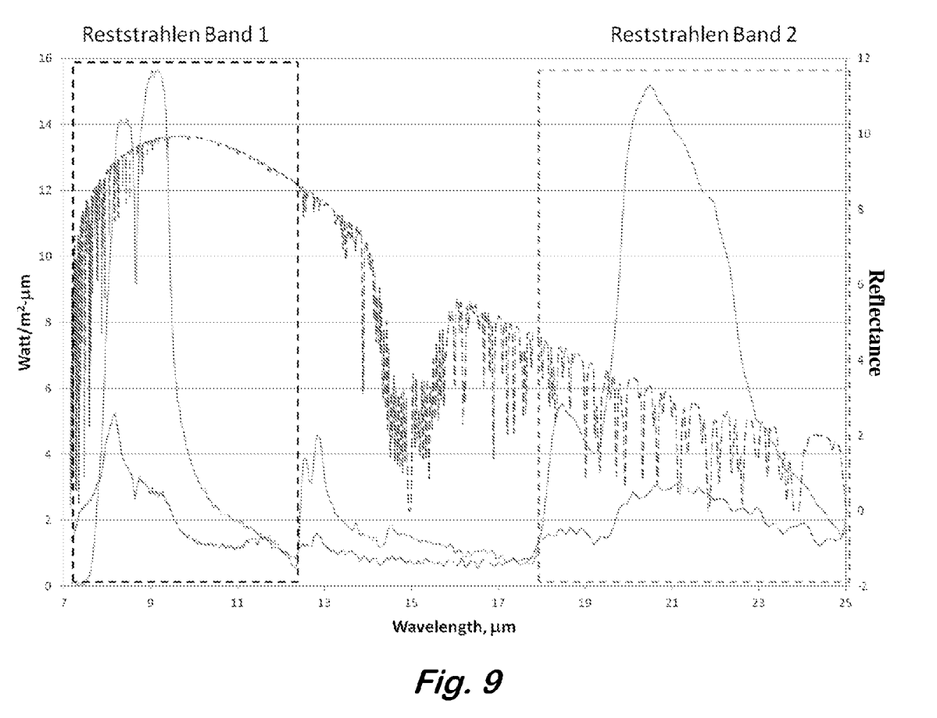
FIG. 9 shows IR reflectance spectra of undisturbed (upper solid) and disturbed (lower solid) earth for long wavelength IR and very long wavelength IR Reststrahlen bands. The MODTRAN calculation of the transmission spectrum of air over a 30 m pathlength is also shown (dashed).

Reststrahlen band 1 occurs in a high power region of the black body curve suggesting that significantly more power will be associated with this band. However, while the black body curve over the spectral range for Reststrahlen band 2 is lower in power, Reststrahlen band 2 exhibits a broader spectral envelope thereby encompassing a larger region of the blackbody curve. The total power emitted from the undisturbed and disturbed sand for 10 m and 30 m standoff distances are calculated by multiplying the blackbody curve data for each standoff distance by the IR reflectance data for the undisturbed and disturbed sand. The area under the resulting curve is then calculated for the spectral region 7-12 µm and 17-25 µm resulting in the total power per meter emitted from the sand over these particular spectral windows.

Both spectra exhibit Reststrahlen bands 1 and 2, however the intensity for these bands is significantly decreased for the disturbed earth sample. The disclosed system monitors reflected power from soil for both Reststrahlen band 1 and 2 resulting in more power delivered to the camera. Because there is more power to the camera spectral differences between the undisturbed and disturbed earth will result in greater contrast enabling higher probability of detection of buried IEDs. Table 1 shows that the power delivered to a camera capable of imaging Reststrahlen band 1 and 2 is almost 2× that of a camera only imaging Reststrahlen band 1. The increased power is directly related to the increased contrast for disturbed earth resulting in a greater probability of detection when Reststrahlen band 1 and 2 are used for imaging.

TABLE 1

| | Power (W/m²) | |
|---|---|---|
| | Reststrahlen band 1 | Reststrahlen band 1 and 2 |
| undisturbed soil | 233 | 411 |
| disturbed soil | 77 | 128 |
| power change | 155 | 283 |

From another experiment, Table 2 presents the calculated power per area (W/m²) emitted from the sand over the spectral windows for Reststrahlen band 1 and Reststrahlen band 2 transmitted over 10 m and 30 m standoff distances. The data in Table 2 shows collecting emitted IR light in the Reststrahlen band 2 spectral band increases the total power available for imaging 1.6 times that if only the Reststrahlen band 1 spectral window is used. Therefore by including the Reststrahlen band 2 spectral band in a disturbed earth imaging system the image contrast can be increased by 1.6 times that of a system only imaging the Reststrahlen band 1 spectral region.

TABLE 2

|  | Power (W/m$^2$) | | | |
|---|---|---|---|---|
|  | 10 m | | 30 m | |
|  | band 1 | band 2 | band 1 | band 2 |
| undisturbed soil | 646 | 353 | 623 | 352 |
| disturbed soil | 462 | 246 | 445 | 246 |
| power change | 184 | 107 | 178 | 106 |
| total power change | 291 | | 284 | |

Obviously, many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

What is claimed is:

1. A method comprising:
   providing an apparatus comprising:
      one or more infrared imagers capable of detecting light having wavelengths of 8-10 microns and 20-22 microns;
         wherein the one or more infrared imagers comprise a window transparent to light having wavelengths of 8-10 microns and 20-22 microns;
   obtaining with the apparatus a first infrared image of an area of ground at a first time;
   obtaining with the apparatus a second infrared image of the area of ground at a second time;
   comparing the second infrared image to the first infrared image; and
   determining, based on the comparison, whether the area of ground was disturbed between the first time and the second time.

2. The method of claim 1;
   wherein the one or more infrared imagers are further capable of detecting light having wavelengths of 7-8 microns, 10-11 microns, 17-20 microns, and 22-25 microns; and
   wherein the window is transparent to light having wavelengths of 7-11 microns and 17-25 microns.

3. The method of claim 1;
   wherein the one or more infrared imagers are further capable of detecting light having wavelengths of 7-8 microns, 10-20 microns, and 22-25 microns; and
   wherein the window is transparent to light having wavelengths of 7-25 microns.

4. The method of claim 1, wherein the one or more infrared imagers are a microbolometer.

5. The method of claim 1, wherein the window is a diamond window.

6. The method of claim 1, wherein the window comprises thallium bromoiodide.

7. The method of claim 1, wherein the window comprises an antireflective structure.

8. The method of claim 1, wherein the window comprises patterned anti-reflection surface structures.

9. The method of claim 1, wherein the window comprises an anti-reflection interference coating.

10. The method of claim 1, wherein the comparison comprises comparing the infrared reflectance of the first image to the infrared reflectance of the second image at wavelengths of 8-10 microns and 20-22 microns.

11. The method of claim 1, wherein the comparison comprises comparing the infrared reflectance of the first image to the infrared reflectance of the second image at wavelengths of 7-11 microns and 17-25 microns.

12. A method comprising:
   providing an apparatus comprising:
      one or more infrared imagers capable of detecting light having wavelengths of 8-10 microns and 20-22 microns;
         wherein the one or more infrared imagers comprise a window transparent to light having wavelengths of 8-10 microns and 20-22 microns;
   obtaining with the apparatus an infrared image of an area of ground;
   determining whether a portion of the infrared image indicates a lower infrared reflectivity than the remainder of the image; and
   determining, based on the presence or absence of the lower infrared reflectivity, whether the area of ground was disturbed.

13. The method of claim 12, wherein the determination comprises comparing the infrared reflectance of the portion to the infrared reflectance of the remainder at wavelengths of 8-10 microns and 20-22 microns.

14. The method of claim 12, wherein the determination comprises comparing the infrared reflectance of the portion to the infrared reflectance of the remainder at wavelengths of 7-11 microns and 17-25 microns.

15. The method of claim 12;
   wherein the one or more infrared imagers are further capable of detecting light having wavelengths of 7-8 microns, 10-11 microns, 17-20 microns, and 22-25 microns; and
   wherein the window is transparent to light having wavelengths of 7-11 microns and 17-25 microns.

16. The method of claim 12;
   wherein the one or more infrared imagers are further capable of detecting light having wavelengths of 7-8 microns, 10-20 microns, and 22-25 microns; and
   wherein the window is transparent to light having wavelengths of 7-25 microns.

17. The method of claim 12, wherein the one or more infrared imagers are a microbolometer.

18. The method of claim 12, wherein the window is a diamond window.

19. The method of claim 12, wherein the window comprises thallium bromoiodide.

20. The method of claim 12, wherein the window comprises an antireflective structure.

21. The method of claim 12, wherein the window comprises patterned anti-reflection surface structures.

22. The method of claim 12, wherein the window comprises an anti-reflection interference coating.

* * * * *